United States Patent [19]

Wu et al.

[11] 4,292,634

[45] Sep. 29, 1981

[54] REAL-TIME MULTIPLE-LOOK SYNTHETIC APERTURE RADAR PROCESSOR FOR SPACECRAFT APPLICATIONS

[76] Inventors: Robert A. Frosch, Administrator of the National Aeronautics and Space Administration, with respect to an invention of Chialin Wu, Pasadena; Vance C. Tyree, Arcadia, both of Calif.

[21] Appl. No.: 969,761

[22] Filed: Dec. 15, 1978

[51] Int. Cl.³ .............................................. G01S 13/90
[52] U.S. Cl. ................................................. 343/5 CM
[58] Field of Search ...................................... 343/5 CM

[56] References Cited
U.S. PATENT DOCUMENTS

4,045,795  8/1977  Fletcher .
4,132,989  1/1979  Frosch .

*Primary Examiner*—T. H. Tubbesing
*Attorney, Agent, or Firm*—Monte F. Mott; John R. Manning; Paul F. McCaul

[57] ABSTRACT

A spaceborne synthetic aperture radar having pipeline multiple-look data processing makes use of excessive azimuth bandwidth in radar echo signals to produce multiple-look images. Time multiplexed single-look image lines from an azimuth correlator go through an energy analyzer which analyzes the mean energy in each separate look to determine the radar antenna electric boresight for use in generating the correct reference functions for the production of high quality SAR images. The multiplexed single look image lines also go through a registration delay to produce multiple-look images.

6 Claims, 9 Drawing Figures

FIG. 1

AZIMUTH
CORRELATOR 12

FIG. 2

AZIMUTH
CORRELATOR 12

REAL-TIME MULTIPLE-LOOK SYNTHETIC APERTURE RADAR PROCESSOR FOR SPACECRAFT APPLICATIONS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to synthetic aperture radar (SAR) and more particularly to a multiple-look SAR for spacecraft applications which makes use of excess azimuth bandwidth in radar echo signals to produce multiple-look SAR images and provide real-time analysis of the antenna electric boresight.

The utility of spaceborne SAR has been extensively investigated in the past decades. Because of the capability of microwaves to penetrate through clouds and the unique contrast characteristics in SAR imagery, radar imaging is considered particularly useful for surface topographic mapping and for all-weather sea state observations. To extend the utility of spaceborne SAR so that the imaging radar could also be used as a global environmental monitoring device, a series of earth and planetary spacecraft may be launched with on-board imaging radars designed to be able to produce imagery with 25 meter resolution and 100 km swath width on the earth's surface. The high resolution and wide swath coverage imply an extremely high data acquisition rate. The large amount of SAR data acquired must be processed to produce images in a satisfactory format. Currently available SAR processors are not able to produce the imagery in a timely and economic manner. An effective way to meet the data processing needs in future anticipated operational radar imaging missions is to employ on-board SAR processors. Such on-board processors would produce SAR imagery from echo signals in real-time. Not only can the transmission bandwidth for imagery data be reduced by a large factor (compared with the unprocessed raw data transmission rate), but direct image transmission to users in the vicinity of the sensor also simplifies the data handling and distribution procedures.

A problem with designing a real-time spaceborne SAR processor is to provide multiple look images and real-time analysis of the antenna electric boresight to derive accurate processing parameters. It is thus desirable to produce time multiplexed single-look image lines from raw radar data storage in real time with a size of azimuth time-bandwidth product corresponding to that of a minimum resolution single-look image. Such SAR has not heretofore been available. Consequently, an object of this invention is to provide a real-time SAR processor which produces multiple-look images and which is capable of real-time analysis of the antenna electric boresight to derive accurate processing parameters.

The Doppler phase history in target impulse response for SAR is directly related to the radar antenna look angle that determines the target area under illumination. The process of tracking the Doppler center frequency and electronically compensating the frequency offset is commonly referred to as "clutterlock". Proper clutterlock is important to the satisfactory reduction of SAR data into imagery. This is particularly important to spacecraft applications which are expected to employ very large size antenna arrays—about 10 meters. At a typical frequency range, L to X bands, the along-track beamwidth is very narrow as compared to the uncertainty in the antenna attitude. To maintain an adequate image signal-to-noise ratio, it is therefore necessary to perform the clutterlock operation to refine the antenna attitude predicts. In a typical case in which clutterlock must be applied, the along-track beamwidth is approximately one degree while the attitude uncertainty in real-time predicts is about ±0.5 degree.

SUMMARY OF THE INVENTION

In accordance with the present invention, high rate SAR data that has been range correlated is processed through an azimuth correlator to produce an even number of time multiplexed single-look image lines with a size of azimuth time-bandwidth product corresponding to that of a minimum resolution single-look image. The time multiplexed single-look image lines go through an energy analyzer which adds the first half of the number of time-multiplexed single-look lines, and from the sum subtracts the last half of the number of time multiplexed single-look lines. The difference in energy is a measure of the antenna electric boresight error, and the sign of the error is an indication of the direction of error. This error data is useful to derive accurate processing delay control and reference function parameters. The time multiplexed single-look image lines also go through a registration delay to produce multiple-look images.

The novel features of the invention are set forth with particularity in the appended claims. The invention will best be understood from the following description when read in conjunction with the accompanying drawings.

DESCRIPTION OF PREFERRED EMBODIMENTS

Figure 1:
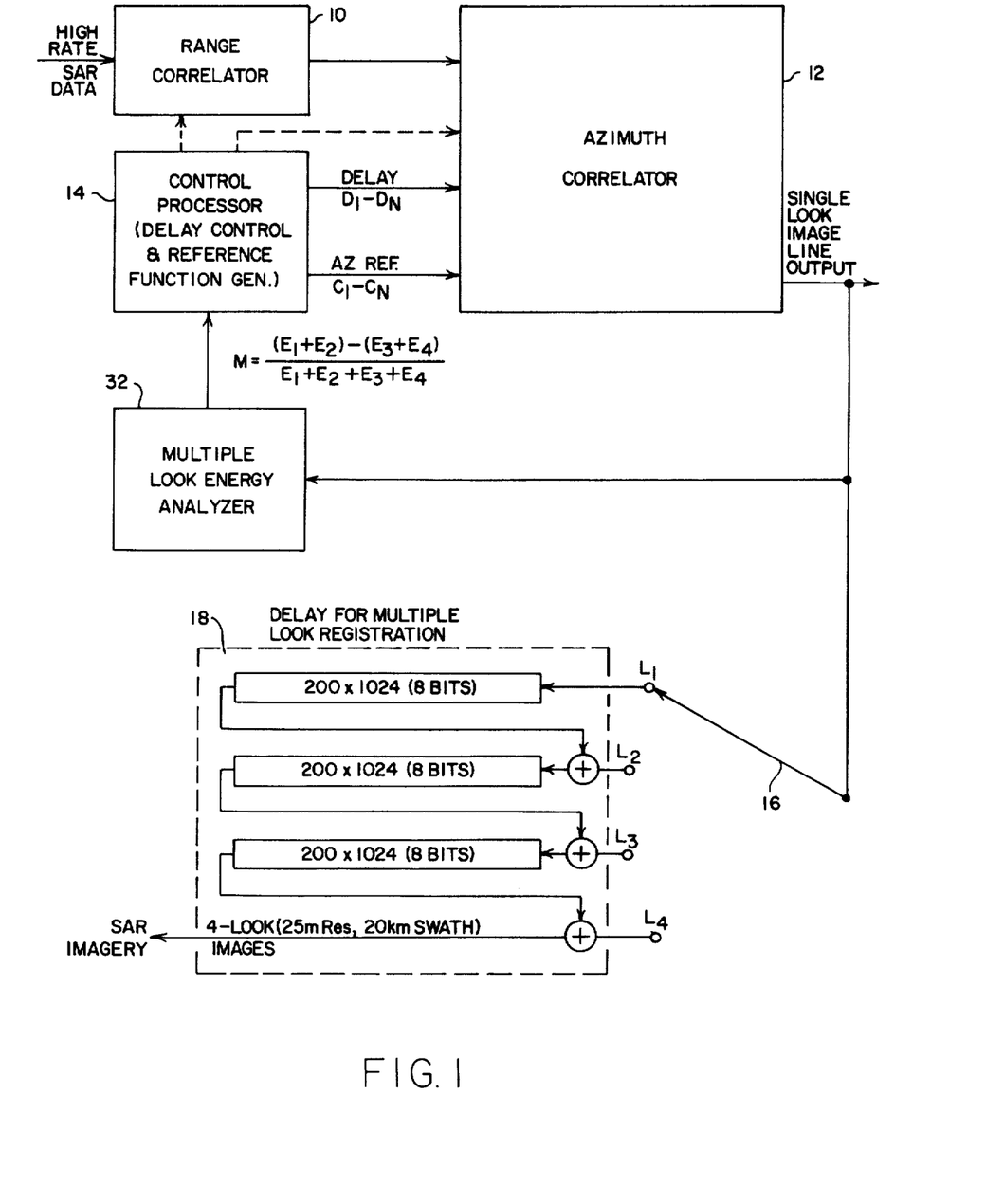
FIG. 1 illustrates in a block diagram the architecture of the present invention.

A block diagram of SAR processor embodying the present invention is shown in FIG. 1. The three major elements are the range correlator 10, the azimuth correlator 12, and the control processor 14. The range correlator compresses the transmitted pulse waveform into a short pulse. The azimuth correlator provides the synthetic aperture processing which refines the antenna azimuth beamwidth. The control processor is mainly responsible for the generation of a target response function (delay control and reference function) which is matched to the received echo signals. A sequencer in the control processor also produces various timing signals to synchronize the data processing operations. This synchronization is illustrated by dotted lines in FIG. 1. The range correlation is performed prior to the azimuth correlation. This order can not be altered since the azimuth Doppler response of a target is range dependent. The image data from the azimuth correlator are applied via a multiplexer 16 to an output overlay registration delay 18 to form a four-look image.

All of this is known in the prior-art of synthetic aperture radars. A more detailed discussion of this organization for SAR can be found in the literature. Only so much of the detail as may be required to understand the present invention will be presented here.

Figure 2:
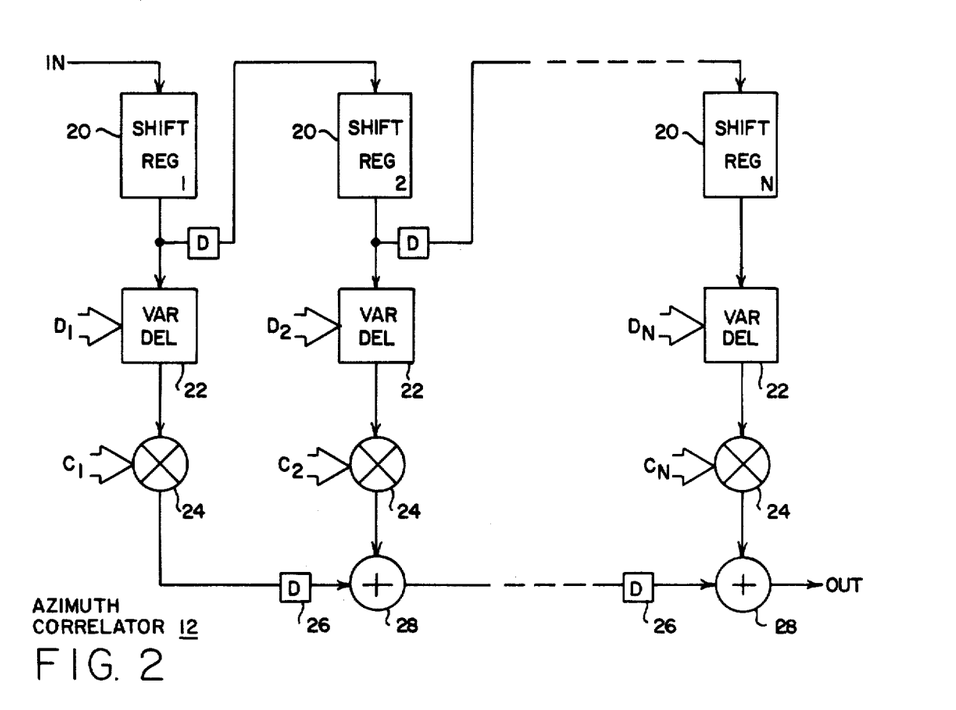
FIG. 2 illustrates a time domain azimuth correlator architecture for the present invention.

After compression in the range correlator, raw data is fed in digital form to the azimuth correlator as a contiguous sequence of "range-lines". As shown in FIG. 2, a typical azimuth correlator is comprised of a number N of shift registers 20. These registers are capable of holding a large number of complex (4-bit real, 4-bit imaginary) data samples. The shift registers are followed by variable delay elements 22 comprised of a number of cascaded stages, selected ones of which may be bypassed to control range-line delay. The exact number of delay stages provided depends upon the amount of range migration to be compensated over the aperture width.

The required integration time carried out by the registers 20 is based on the following factors: the doppler chirp rate, the sensor speed relative to the planet's surface, and the azimuth resolution requirement. Assuming a 25 m resolution requirement, a 0.62 second-per-look integration time is provided. The number of range pulses to be integrated per look is thus about 1024 at a 1645 PRF value. The effect of earth rotation in conjunction with an attitude variation of ±1° in roll, pitch, and yaw corresponds to a doppler frequency range of approximately ±3000 Hz. Such a doppler frequency range calls for a range migration compensation capability of 128 range bins (complex samples) over the total four-look integration time. More specifically, the azimuth correlation requires an array of 1024 registers to perform a 20 km swath correlation in azimuth with four looks. The registers require 1025 stages to select the appropriate set of 1024 complex data samples from each range-line. The one extra stage on the register is used to synchronize the data flow. The number N of registers is a function of the desired image resolution in azimuth. Each data sample is multiplied by the appropriate complex azimuth reference function coefficients $C_1$ to $C_N$ using multipliers 24. Range migration compensation is accomplished by delay control function coefficients $D_1$ to $D_N$ applied to the variable delay elements 22.

Figure 3:
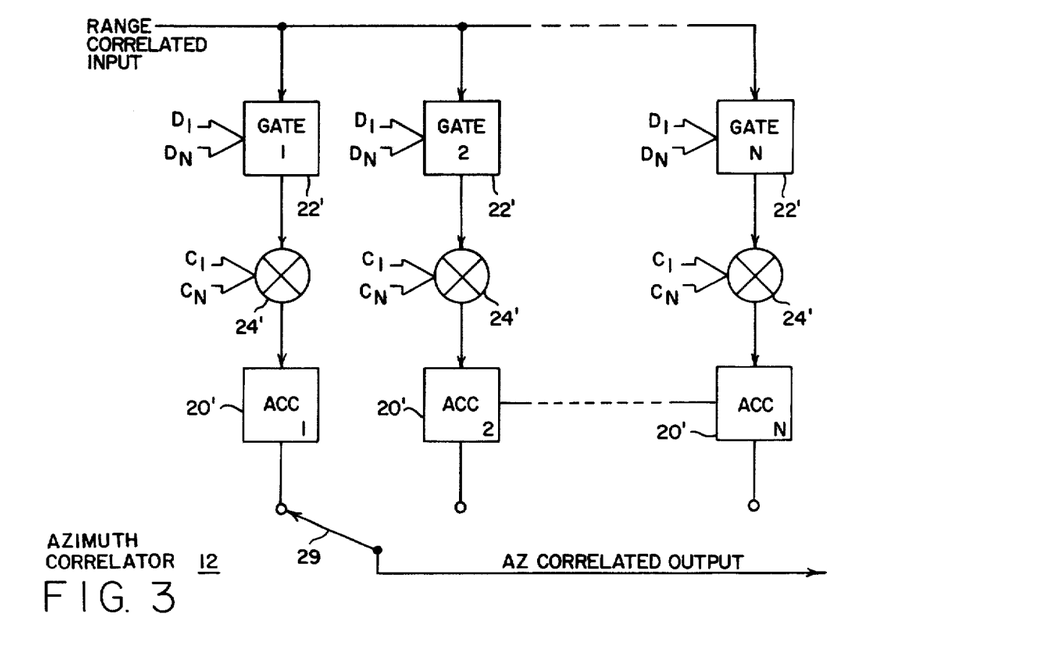
FIG. 3 illustrates an alternative time domain azimuth correlator architecture.

FIG. 3 illustrates an alternate architecture for the azimuth correlator wherein the elements performing the analogous functions as in the architecture of FIG. 2 are identified by the same reference numerals primed. This azimuth correlator architecture permits parallel image line processing for all looks. Gates 22' respond to the delay functions $D_1$ through $D_N$ for range migration compensation, multipliers 24' respond to the reference functions $C_1$ through $C_N$ and accumulators 20' perform line storage for coherent integration. Each image-line accumulator comprises the functional equivalent of a complex adder and a recirculating image-line memory. The complex adder accepts the output of the complex multiplier 24' (8 bit real component and 8 bit imaginary component) and the corresponding accumulator sample (16 bits I and 16 bits Q). The outputs of the accumulators 20' are combined into an azimuth correlated output by a multiplexer 29. The output of the multiplexer is thus an accumulated sum corresponding to the output of the correlator shown in FIG. 2. The accumulated sum is passed through the multiplexer 16 which will route the complex sums to the registers of the image-line registration delay 18 (FIG. 1). The latter combines the single look image outputs into four-look images. The complex sums are also routed to a multiple look energy analyzer 32 (FIG. 1).

In the architecture of FIG. 2, the outputs of the multipliers 24 are applied to holding elements 26 and summers 28 to form a single-look image element. Each 1024 range-line input points will generate an output image line of 1024 elements of the same look, but over this 1024 range-line point period, several reference functions are used to accommodate the range dependent nature of these references. A different set of reference coefficients will be applied to the next range-line input points to generate an image line of another look. In a four-look system, four sets of reference functions will be stored in buffer registers within the control processor for cyclic use and update. Since the SAR processing is performed at a very high data rate, double buffer registers are to be provided so the delay and reference functions for the next cycle may be updated while the present set of delay and reference functions are being used.

The output of the energy analyzer 32 (FIG. 1) is fed to the control processor 14. The main function of the control processor is to derive accurate phase references for the synthetic aperture processing. From the previous discussion it is clear that the doppler center frequency and the doppler frequency rate are the two major parameters in defining the phase delay history. There are two ways to determine these two parameters. The first approach which is considered an exact approach calculates those two parameters based on the relative position, velocity and acceleration vectors. For an earth satellite, accurate spacecraft position and velocity vectors may be derived using the Global Positioning System which is planned to be operational in the 1980 time frame. Once the sensor position is established, the target positions will be determined by a complicated footprint procedure with the antenna attitude as another input. This exact approach appears difficult to perform in real-time because of its complicated arithmetic procedures. A simpler approach is to treat the doppler center frequency and the doppler chirp rate separately. The procedure to determine the doppler center frequency, and to generate compensation phase factors, is generally referred to as clutterlock.

Figure 4:
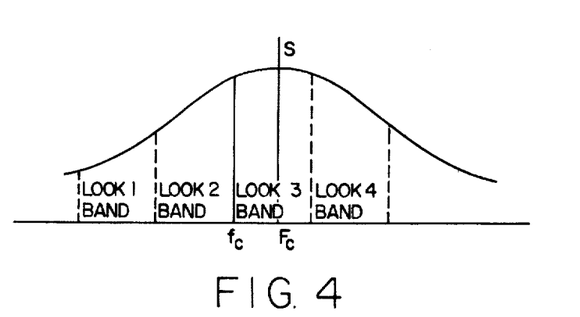
FIG. 4 illustrates typical energy distribution of a synthetic aperture radar azimuth spectrum for four-look imaging.

In spaceborne SAR processing, the uncertainty in the real-time predicts for the antenna attitude may be comparable to the antenna beam width. The purpose of the energy analyzer thus is to refine the antenna attitude prediction and thereby maximize the utility of transmitted energy in the azimuth dimension. For the exemplary embodiment, four-look processing is illustrated. The spectrum selected for processing will be equally partitioned into four parts, each for a single look. It is possible to set the gain of the four single-look correlators to be equal to each other. The image energy of each look thus is proportional to the energy in the corresponding spectral band. The azimuth spectrum will resemble the antenna pattern in that dimension. Let $E_i$ be the energy of the i-th look ($L_i$). A normalized measure which indicates the symmetry of the energy on the looks relative to the center of the processing band can be written as $$M = (E_1 + E_2 - E_3 - E_4)/(E_1 + E_2 + E_3 + E_4)$$

where the look numbers are ordered as shown in FIG. 4. By applying proper delay in accumulating the $E_i$ values, it is possible to have the $E_i$ values all correspond to the same target area, therefore the measurement M is independent of any target scene variation. The M value is expected to be zero if a perfect match between the estimated and the true center frequencies is achieved. The integrated value of M can be used to drive a digital version of a voltage controlled oscillator (VCO) to generate a new sinusoidal signal to be mixed with the range correlated signal (to offset the doppler center frequency) or to form a new set of the phase references for azimuth processing. After this is completed, a new M value is integrated with the previously stored M value to generate another offset frequency. The feedback control in this scheme indeed resembles that of a phase-locked-loop. Since the M measurement is independent of scene content, convergence can be attained by properly scaling the integrated M values.

The present invention utilizes available single-look image data and it therefore minimizes the hardware required to perform this azimuth spectrum analysis. Moreover, this method can tolerate a large noise/ambiguity level on the input signals. An example is briefly discussed here. The original azimuth spectra of four different signal-to-noise ratios are plotted in FIG. 5. With a processing bandwidth of approximately 0.8 PRF for a total of four looks, the M values of different center frequency estimates (normalized to PRF) are plotted in FIG. 6. The position of zero crossings all agree well with the spectral peaks. The clutterlock approach described above measures and reduces the centerband doppler frequency. The remaining parameter, the doppler chirp rate, may be estimated by substituting values of the wavelength, slant range, relative speed, the gravitation and look angle which are usually known. The relative speed is a function of both the sensor and target positions. If the spacecraft position and velocity are known, the sensor-target relative speed can be estimated using basic trigonometric operations. With both the doppler frequency and the frequency rate determined, the phase reference functions to be fed to the azimuth correlator for synthetic aperture processing are well defined. Using the interpulse period as another input, the quadratic phase history is easily obtained by a simple two-step integration of the doppler parameters.

Raw SAR data into the range correlator 10 is digitized and compressed. It is then fed to the azimuth correlator 12 wherein the architecture of FIG. 2, variable delays 22 for each element are controlled by levels $D_1$ through $D_N$ stored in the control processor 14. The delays can be different from element to element. The variable delays output N numbers in parallel which are multiplied respectively by N reference values $C_1$ through $C_N$ fed by the control processor. The results are applied to holding elements 26 and summers 28 to form a single look image element. Every 1024 input points generate 1024 elements of a single-look imaging line. Over this 1024 point period, several reference functions stored in the control processor are used. That is to accommodate the range dependent nature of these references. A different set of references stored in the control processor will be applied to the 1024 points of the next input line to generate an image line of another look. So in a four-look system, four sets of reference functions are stored in the control processor and used cyclically. The look number of output images therefore repeats at a period of every four output overlay registration delay 18 to form a four-look image, the line distribution of which is based on the number of looks at that image line. The energy analyzer 32 is used to add the lines of the first and second looks, and from that sum subtract the lines from third and fourth looks. The result is then divided by the sum to provide a normalized difference between the first two and the last two looks to determine the direction and the amount the antenna electric boresight is off the center. This energy analysis is used to track and refine the radar antenna boresight to form a closed-loop control of the SAR processing.

Initially, a set of delays $D_1-D_N$ is assumed based on some prior knowledge of antenna boresight. The energy for each different look is analyzed as described, and the result is used in the control processor to reset the variable delays $D_1-D_N$. The control processor also generates new reference functions based on the energy analysis. In practice, the delay and reference functions generated will be stored in buffer registers within the control processor for cyclic use and update.

From the foregoing it can be readily appreciated that to produce multiple-look imagery, the time-domain correlators may be structured into a number of modules, each producing single-look imagery. Assuming that the doppler center frequency and the doppler chirp rate are known, the phase reference function over the total synthetic aperture is determined. This function is partitioned into several segments of equal length. Each segment of the reference function is then used to produce a single-look image line output. This method causes the different looks at each target location to correspond to data acquired at different times relative to the center of the synthetic aperture. To overlay the separate looks at the image element, the proper time delay must be applied to the output of single-look image lines. Using the right parameters for the reference, and assuming that the length of synthetic aperture is set to be a constant for each look, the timing delay to register the image lines from adjacent looks is a constant throughout the swath.

The basis for the energy analysis is the fact that the SAR azimuth spectrum for homogenous targets corresponds to the SAR antenna response along the azimuth direction. The antenna response is generally designed to be symmetric with respect to the center peak response. The azimuth spectrum has similar symmetric patterns. Thus, a test of symmetry on the spectral power verifies the validity of the predicted doppler center frequency. If the predicted frequency is off the true value, a better estimate will be fed into the correlation reference generator to produce a new set of azimuth reference functions.

Figure 7:
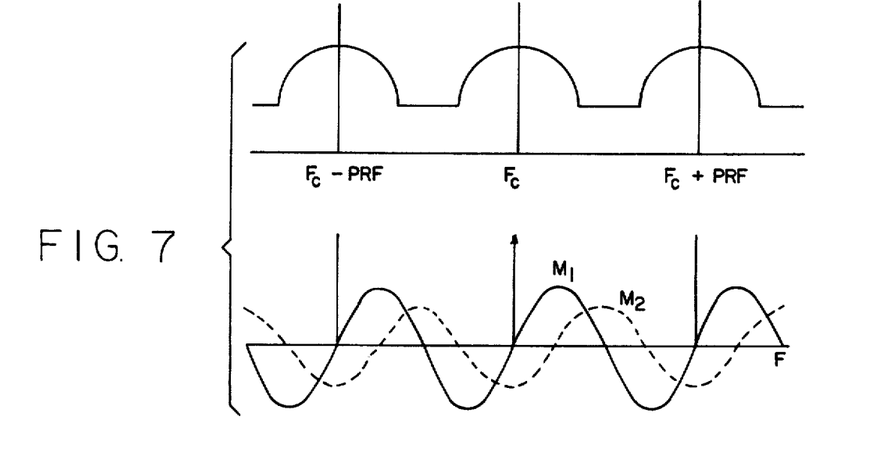
FIG. 7 is a conceptual drawing of the spectral pattern and the general behavior of the measure of energy distribution as a function of frequency offset.

The azimuth correlator is designed to produce four-look SAR imagery. Prior to the multiple-look registration, the four separate single-look images, each produced from an unique portion of the azimuth spectrum, can be used to evaluate the spectral energy distribution around the center frequency. An illustration of the multiple-look spectral bands is shown in FIG. 4, where $F_c$ is the true center frequency, and $f_c$ the predicted value used to define the four correlation filters. Let $E_i$ be the mean image energy of the i-th look. Since correlation processing is a linear operation, each $E_i$ value is porportional to the mean spectral energy integrated over the i-th look spectral band. The four single-look filters have the same gain. Thus all $E_i$ values are directly comparable. A measure of the symmetry about the selected center frequency can thus be defined as $$M_1 = (E_1 + E_2 - E_3 - E_4)/P \text{ where}$$
$$P = E_1 + E_2 + E_3 + E_4.$$

as noted hereinbefore. The measure $M_1$ is normalized by the total energy P, therefore the result is relatively unaffected by the absolute brightness of the scene. A conceptual drawing of the spectral pattern and the general behavior of $M_1$ as a function of the frequency offset, $F = F_c - f_c$ is shown in FIG. 7. The spectrum peaks drawn in the figure repeat every PRF interval. This is because the SAR azimuth response is in fact sampled by discrete radar pulses emitted from the sensor. The value of $M_1$ is zero at the peak positions as well as at the midpoints between peaks. Another measure, $M_2$, defined by:

$$M_2 = (E_1 - E_2 - E_3 + E_4)/P$$

would then be used to distinguish the peaks from the minimums. The value of $M_2$ is shown by dashed lines in FIG. 7. Note that those false solutions (minimum spectral responses) correspond to positive $M_2$ values. Also observe that the sign of $M_1$ is an indicator to infer the position of the "nearest" spectral peak. That is, for a negative $M_1$ the peak frequency is greater than the selected $f_c$ value. The reverse is true for positive $M_1$.

Figure 8:
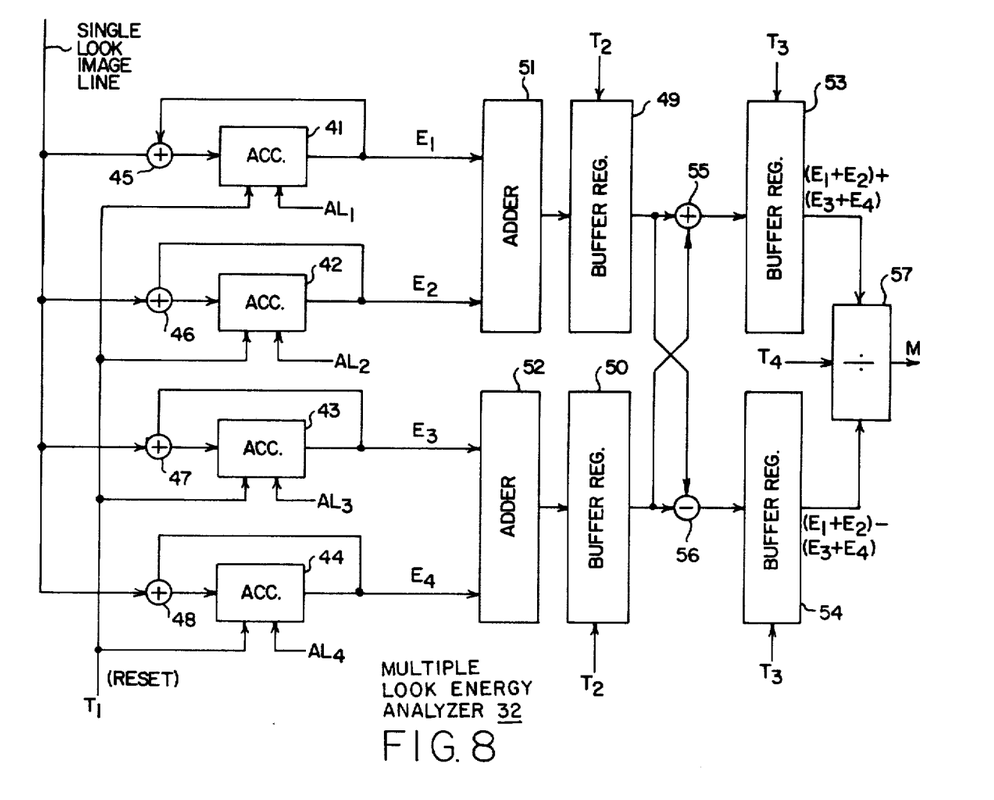
FIG. 8 illustrates the architecture of an exemplary multiple-look energy analyzer.

Referring now to FIG. 8, the exemplary architecture for the energy analyzer is comprised of four accumulators 41 through 44 which are enabled in sequence to accumulate the values of points in the successive single looks to develop integrated values of $E_1$, $E_2$, $E_3$ and $E_4$ using adders 45, 46, 47 and 48. By this proper delay in accumulating the $E_i$ values all correspond to the same target area. Therefore the measurement M is independent of any target scene variation. Once the four looks have been integrated into these energy values, two separate values are combined at time $T_2$ in buffer registers 49 and 50 through adders 51 and 52 to form the sums $E_1 + E_2$ and $E_3 + E_4$. After enough time for propagation of the carrier in the addition process, the sums are combined in buffer registers 53 and 54 via an adder 55 and a subtractor 56 at time $T_3$ to form the sum ($E_1 + E_2$) + ($E_3 + E_4$) and difference ($E_1 + E_2$) − ($E_3 + E_4$). The difference is then divided by the sum to produce the value M which indicates the symmetry of the energy on the looks relative to the center of the processing band. The division process indicated by a block 57 will require significantly more time than the addition and subtraction processes, which can be carried out using parallel logic networks, but the process may nevertheless be carried out beginning at time $T_4$ while the next set of energy values $E_1$ through $E_4$ are being integrated beginning at time $T_1$, where the times $T_1$ through $T_4$ are generated cyclically by a clock pulse counter (not shown) as required. This computed value of M is then used by the control processor to update four sets of delay factors $D_1$-$D_N$ and azimuth reference function coefficients $C_1$-$C_N$ for the four looks. Since the control processor usually includes a programmed digital computer, the more common practice is to use the digital computer for this division process.

Figure 5:
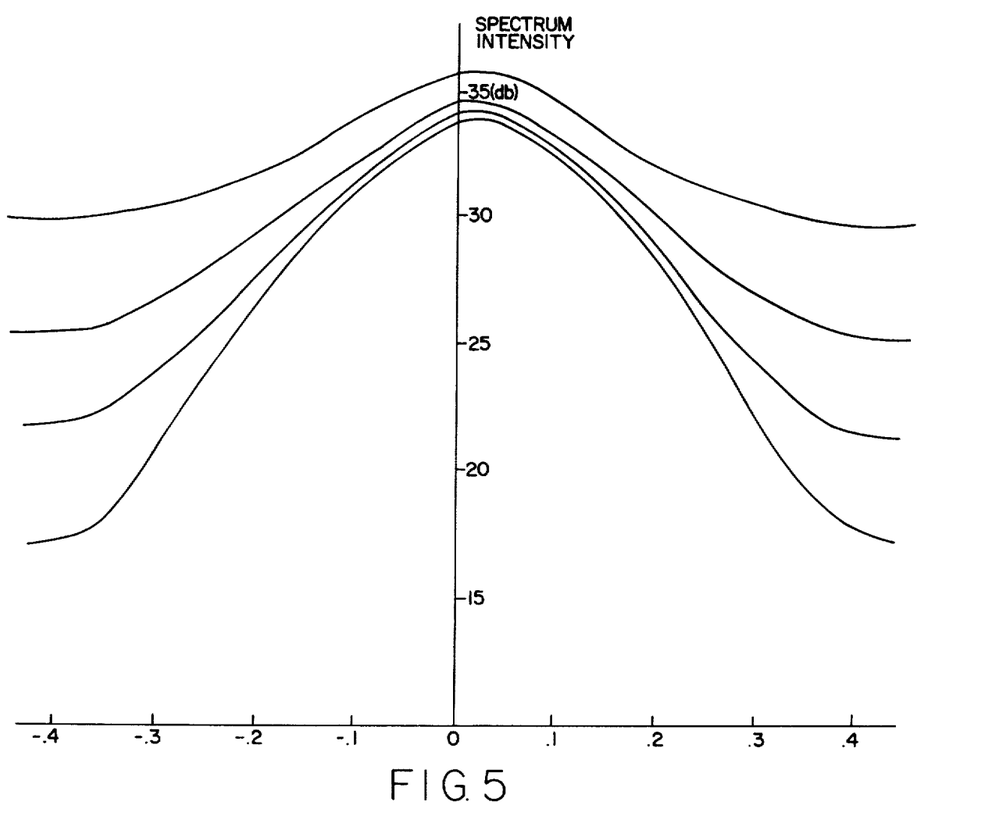
FIG. 5 is a plot of the original azimuth spectra of four different signal-to-noise ratios as examples for a discussion of the noise tolerance of the system of FIG. 1.

It is important to note that spectral energy analysis can be effective as the direct analysis of the azimuth spectrum. Computer simulations have been made on real SAR data. FIG. 5 shows the azimuth spectra of four data sets that have different input noise contents. Each data point is obtained by first selecting a center frequency $f_c$ and then defining four spectral bands. The energy in each band is integrated separately. The mean energy values of the four bands are then used to obtain the $M_1$ value. It is observed that the center frequency is located slightly on the right hand side of the origin, and the input noise condition does not have apparent effect on the accuracy of the determination.

Figure 6:
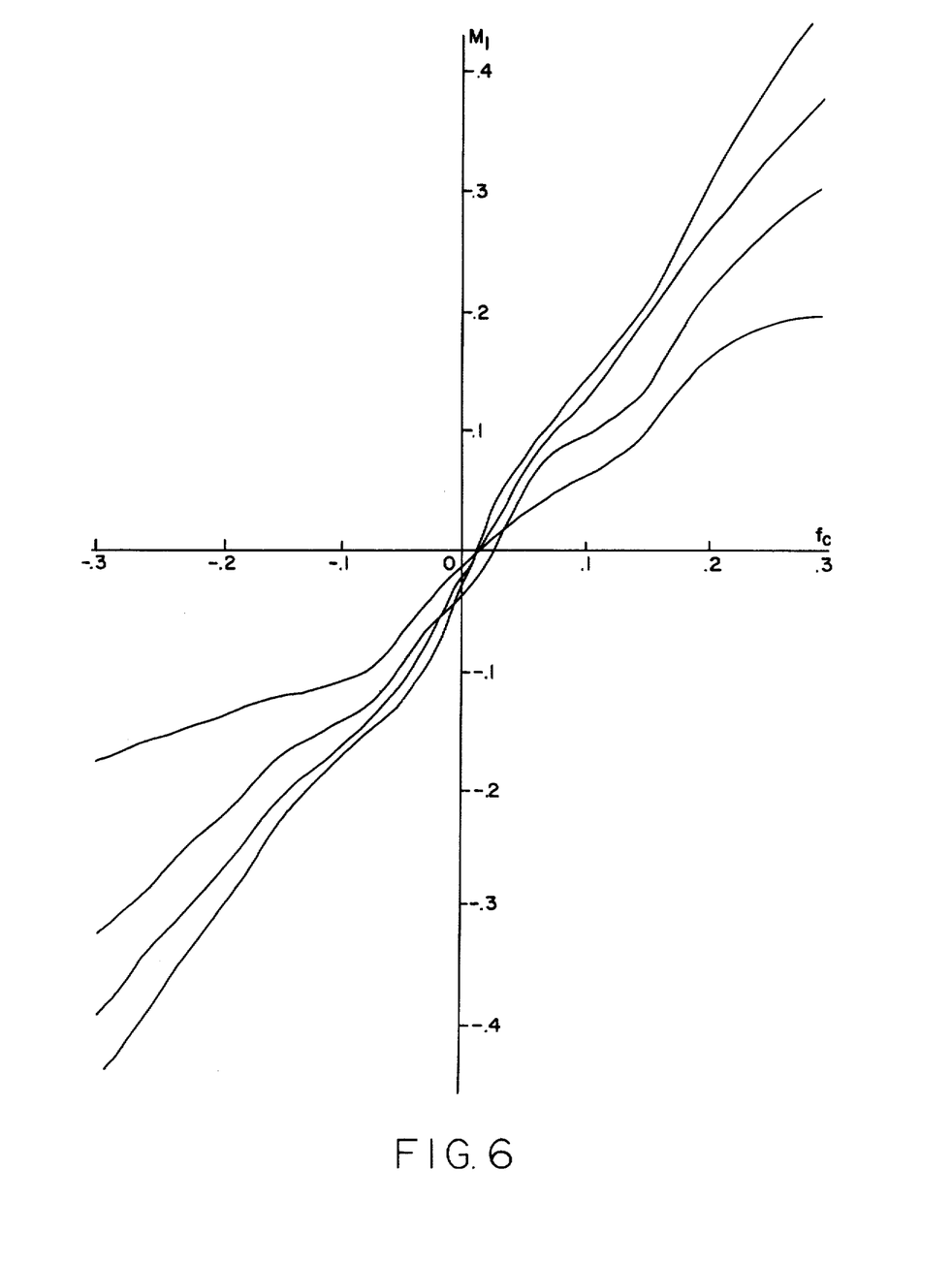
FIG. 6 is a plot of the normalized measure of energy distribution between the first two looks and the last two looks of a four-look imaging system for the four plots of FIG. 5 as a function of center frequency.

The curves in FIG. 6 were obtained by analyzing the energy distribution in images of four different looks. A center frequency was first selected. Different look filters were formulated. The energy in the resultant images were used to calculate the $M_1$ measures. The zero crossing points interpolated from the measurements are consistent with the results obtained in FIG. 5. This demonstrates the equal effectiveness of the multiple-look energy analysis approach to the Doppler center frequency determination.

Figure 9:
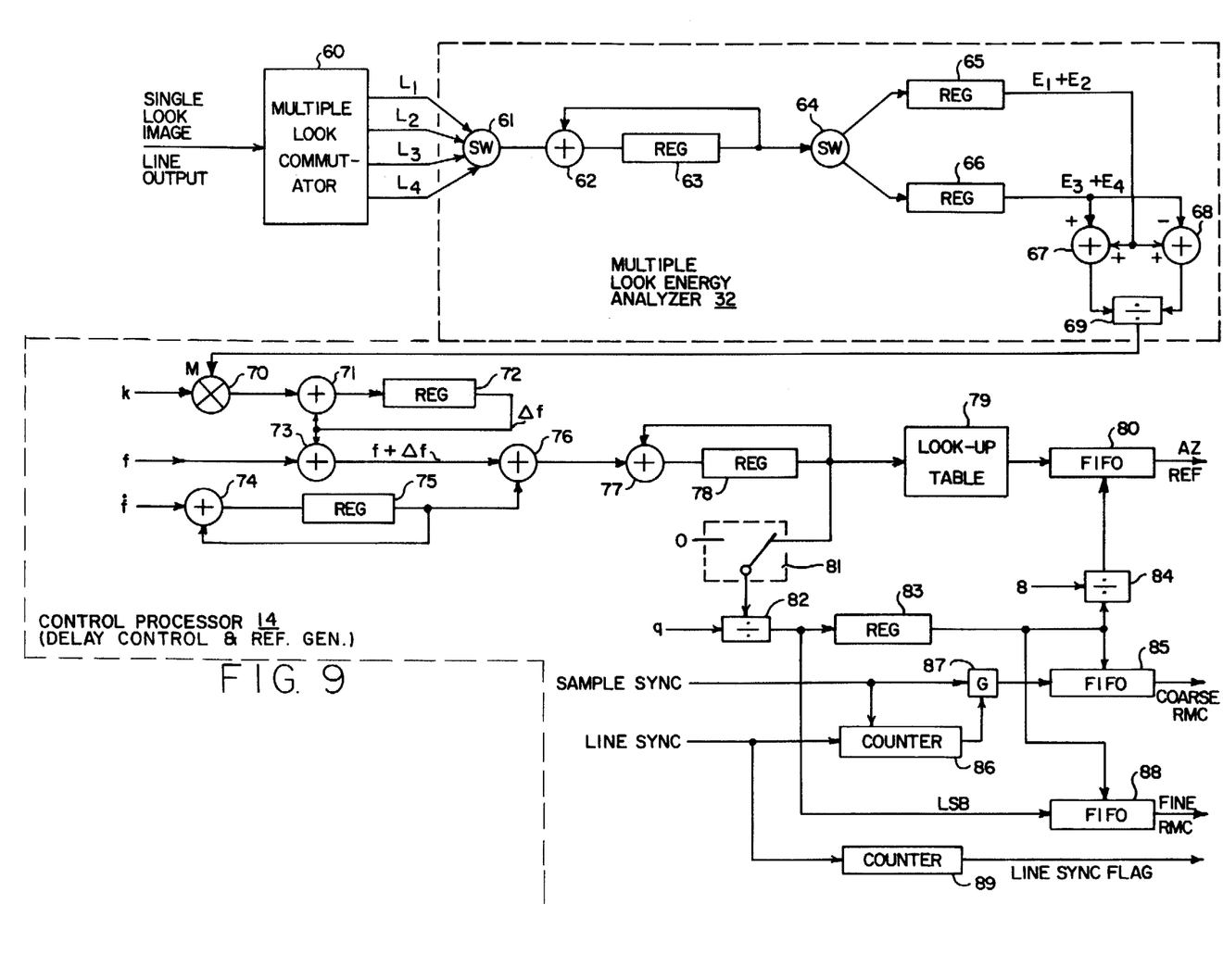
FIG. 9 illustrates the architecture of a preferred multiple-look energy analyzer and a control processor for a delay control and a reference function generator in the closed-loop system of FIG. 1.

In the exemplary implementation of the multiple-look energy analyzer shown in FIG. 8, separate accumulators are used to form the quantities $E_1$, $E_2$, $E_3$ and $E_4$. It would be possible to time share one accumulator as shown in FIG. 9 for the energy analyzer 32 in the exemplary implementation of both the energy analyzer 32 and so much of the control processor 14 as relates to delay control and reference function generation. A multiple look commutator 60 converts the single look image line output of the azimuth correlator 12 (FIG. 1) into four look lines (much the same as schematically indicated by switch 16 in FIG. 1). A switch 61 then selects inputs from the four looks for accumulation. That switch connects the look $L_1$ for a predetermined number (e.g. 256) range lines. It then switches to look $L_2$, $L_3$ and $L_4$ sequentially for the same period of time. In practice the functions of the switches 60 and 61 will be integrated into one electronic switch network; two are shown only for simplicity of discussion.

An accumulator comprised of a one-word (e.g. 32 bit) adder 62 and a one-word register 63 accumulates pixels from looks $L_1$ and $L_2$, and then resets to accumulate pixels from looks $L_3$ and $L_4$, thus forming first the sum $E_1 + E_2$ and then the sum $E_3 + E_4$. A switch 64 directs these separate sums to storage registers 65 and 66. Adders 64 and 68 then form the sum ($E_1 + E_2$) + ($E_3 + E_4$) and difference ($E_1 + E_2$) − ($E_3 + E_4$) which are presented to a divider 69 which computes the normalized energy difference M.

The balance of FIG. 9 illustrates an architecture for the control processor 14. The first task performed is to generate from the quantity M phase delay coefficients using a scaling constant, k, provided by a control computer (not shown), and estimates of both doppler center frequency, f, and a frequency rate, ḟ. (All of these inputs from a control computer are stored in buffer registers not shown.) A multiplier 70 forms the product kM, and an accumulator comprised of an adder 71 and register 72 forms a sum $\Delta f$ from the accumulated product kM over a period of time. This quantity is then added to the center frequency estimate f in an adder 73. An integrator comprised of an adder 74 and a register 75 continually computes an updating quantity of frequency from the frequency rate, which is then added in an adder 76 to the output $f+\Delta f$ of the adder 73 to present instantaneous frequency to a phase integrator comprised of an adder 77 and a register 78. The result is a sequence of phase angle outputs which are used in a look-up table 79 that converts phase delay into complex reference coefficients. A first-in-first out (FIFO) register 80 is used to adjust timing of the complex phase coefficients into the azimuth correlator. The delay control for this FIFO is received from a network that receives the output of the phase delay integrator and provides conversion of phase delay coefficients to range migration coefficients, as will now be described.

A switch 81 accepts phase delay coefficients, but switches to a zero input value at the end of every predetermined number (e.g., 1024) of range lines to generate range migration coefficients that properly synchronizes the output timing of the single-look azimuth correlator. A divider 82 divides the phase delay coefficients by a predetermined factor q (e.g. 14) to generate the delay values in terms of number of interpolated range bins. A register 83 stores the first range delay value from each group of delay values over each range line. A divider 84 divides the output of the register 83 by a factor of 8 to control the delay in loading the comlex azimuth coefficients into the azimuth correlator. The output of the register 83 is also applied to a first-in-first-out (FIFO) register 85 used to control the delay of entering a sequence of 1's into the azimuth correlator as coarse range migration coefficients (RMC). A counter 86 changes its output state every predetermined number (1024) sample clock periods and is reset by a line sync clock. A gate 87 accepts the sample clock and transmits a sequence of consecutive 1's. The output of the register 83 also provide delay control for a first-in-first-out (FIFO) register 88 that receives the one least significant bit LSB from the output of the divider 82 to provide a fine range migration coefficient to the azimuth correlator. A counter 89 changes its output stage every predetermined number (1024) line sync periods to provide a line sync output flag to the azimuth correlator.

FIG. 9 thus illustrates an exemplary architecture for not only the multiple look analyzer 32, but also the delay control and reference function generator of the control processor 14. Although the architecture is illustrated with hardware components, it is clear that in practice a control computer may be programmed to carry out the operations indicated. What is important is the fact that clutterlock is achieved using the output, M, of the multiple-look energy analyzer to generate delay control coefficients $D_1$ through $D_N$ and azimuth reference coefficients $C_1$ through $C_N$. The values of M are used to continually form new sets of the phase references for azimuth correlation. The feedback control in the system resembles that of a phase-lock loop, but is distinct and therefore referred to as clutterlock. Since the M measurements are independent of scene content because each $E_i$ value corresponds to the same target, convergence can be attained by properly scaling the M values using the constant k. This clutterlock approach measures and reduces the centerband doppler frequency f by generating a value $\Delta f = kM$ that is added to the predict f. The remaining parameter $\dot{f}$, the doppler chirp rate, may be estimated by the control computer from the geometry of the situation taking into account wavelength, slant range, relative target speed, gravitational acceleration and the look angle. With both the doppler frequency f and the frequency rate determined, the phase reference functions to be fed to the azimuth correlator for synthetic aperture processing are well defined. In other words, the procedure of computing the azimuth reference coefficients from predicts and measurements is carried out in two stages. The first step is to calculate basic SAR processing parameters, namely the doppler center frequency and the doppler center frequency along a section of the swath. The second is then to generate the azimuth reference function coefficients from the basic SAR processing parameters. This clutterlock approach accomplishes those two steps in a closed loop control system.

Although particular emodiments of the invention have been described and illustrated herein, it is recognized that modifications and variations may readily occur to those skilled in the art and consequently, it is intended that the claims be interpreted to cover such modifications and equivalents.

What is claimed is:

1. In a synthetic aperture data processor having pipeline multiple-look data capability with time-multiplexed single-look image lines from an azimuth correlator, the combination comprising means for analyzing the mean energy in an even number of multiple looks of the same target and means responsive to the mean energy for closed-loop control processing of delay control and reference function coefficients for said azimuth correlator to track and refine the radar antenna boresight information.

2. The combination of claim 1 werein said energy analyzing means includes means for summing the energy for each different look, means for adding the energy of the first half of the even number of multiple looks to form a first multiple look sum, means for adding the energy of the second half of the even number of multiple looks to form a second multiple look sum, means for separately forming the sum and difference of said first and second multiple look sum, and means for forming the quotient of the difference of said first and second multiple look sum divided by the sum of said first and second multiple look sum, thereby to determine a quantity M that is a measure of the symmetry of the energy on the looks relative to the center of the processing band for use in the generation of said delay control and reference function coefficients.

3. The combination of claim 2 including means connected to said correlator for registration delay of time-multiplexed single-look image lines to produce multiple-look images.

4. In a spacecraft synthetic aperture radar processor having multiple-look data capability and using an even number of time-multiplexed single-look image lines from an azimuth correlator to analyze the mean energy in each of N separate looks of the same target area to determine a quantity M which is a measure that indicates the symmetry of the energy on the looks relative to the center of the processing band for use in generating the correct delay control for range migration correction and reference functions for the production of synthetic aperture radar images, said energy analyzer comprising means for adding the single-look image lines of the first half of the even number of multiple looks and for separately adding and subtracting from the sum of the first half of the even number of multiple looks the sum of the last half of the even number of multiple looks, and from the sum and difference thus formed, producing a normalized quantity M by means for dividing the difference thus formed by the sum thus formed, and means responsive to said normalized quantity M for generating delay control and reference functions for said azimuth correlator, whereby excessive azimuth bandwidth in radar echo signals is used to produce high quality spacecraft SAR images.

5. The combination of claim 5 wherein said means for generating delay control and reference functions for said azimuth correlator includes means for scaling said quantity M by a predetermined factor k, means responsive to the scaled quantity kM, a doppler frequency estimate, f, and a frequency rate, $\dot{f}$, for generation of phase delay coefficients, means responsive to said phase delay coefficients for generation of azimuth reference coefficients, and means responsive to said phase delay coefficients for generation of range migration correction coefficients.

6. The combination of claim 5 including means connected to said correlator for registraton delay of time-multiplexed single-look image lines to produce multiple-look images.

* * * * *